(12) United States Patent
Winter et al.

(10) Patent No.: US 10,539,473 B2
(45) Date of Patent: Jan. 21, 2020

(54) SYSTEMS FOR MONITORING THE ENVIRONMENTAL HISTORY OF A COMPONENT

(71) Applicant: The Boeing Company, Chicago, IL (US)

(72) Inventors: Eric Winter, Freeland, WA (US); Gregory Robert Gleason, Seattle, WA (US); Wesley L. Holman, Mill Creek, WA (US); Gary Georgeson, Tacoma, WA (US); Scott Robert Johnston, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 446 days.

(21) Appl. No.: 15/231,557

(22) Filed: Aug. 8, 2016

(65) Prior Publication Data
US 2018/0038744 A1 Feb. 8, 2018

(51) Int. Cl.
*G01K 11/16* (2006.01)
(52) U.S. Cl.
CPC .................................. *G01K 11/16* (2013.01)
(58) Field of Classification Search
CPC ........................................................ G01K 11/16
USPC ................. 116/200, 201, 206, 207, 216, 221
See application file for complete search history.

(56) References Cited

U.S. PATENT DOCUMENTS

| 5,644,352 | A | * | 7/1997 | Chang | ...................... | B41J 2/315 |
| | | | | | | 283/67 |
| 6,200,508 | B1 | | 3/2001 | Jacobson et al. | | |
| 7,829,162 | B2 | * | 11/2010 | Eskra | ...................... | B41M 5/385 |
| | | | | | | 400/241 |
| 8,691,383 | B2 | | 4/2014 | Georgeson et al. | | |
| 8,720,278 | B1 | | 5/2014 | Toivola et al. | | |
| 9,085,052 | B1 | | 7/2015 | Georgeson et al. | | |
| 9,372,177 | B2 | | 6/2016 | Georgeson et al. | | |
| 10,024,792 | B2 | * | 7/2018 | Toivola | ...................... | B64F 5/60 |
| 2004/0151978 | A1 | | 8/2004 | Huang | | |
| 2005/0184561 | A1 | * | 8/2005 | Martino | .................. | G02F 1/161 |
| | | | | | | 296/211 |

(Continued)

OTHER PUBLICATIONS

Jennifer A. Lewis et al., Direct Writing in Three Dimensions, article published in materialstoday, vol. 7, Issues 7-8, URL: http://www.sciencedirect.com/science/article/pii/S136970210400344X, Jul./Aug. 2004, 8 pages.

(Continued)

*Primary Examiner* — Nimeshkumar D Patel
*Assistant Examiner* — Tania Courson
(74) *Attorney, Agent, or Firm* — Kolisch Hartwell, P.C.

(57) ABSTRACT

Methods and systems for monitoring an environment history of a component using an indicator array that includes energy exposure indicator pads direct-printed onto a surface of the component in a geometric pattern. Each of the plurality of energy exposure indicator pads in the geometric pattern may include a mechanochromic material, a first thermochromic indicator responsive within a first temperature range, a second thermochromic indicator responsive within a second temperature range, and a third thermochromic indicator responsive within a third temperature range, provided that the first, second, and third temperature ranges are distinct from one another.

20 Claims, 4 Drawing Sheets

(56) References Cited

U.S. PATENT DOCUMENTS

| | | | | |
|---|---|---|---|---|
| 2005/0254551 | A1* | 11/2005 | McClure | G01K 11/12 374/162 |
| 2006/0088355 | A1* | 4/2006 | Ribi | B41J 3/28 400/88 |
| 2008/0063026 | A1* | 3/2008 | Roche | F16B 43/00 374/162 |
| 2010/0247223 | A1* | 9/2010 | Ribi | B41M 5/124 401/195 |
| 2011/0148984 | A1* | 6/2011 | Ribi | B41J 3/28 347/37 |
| 2012/0266806 | A1* | 10/2012 | Ribi | C09B 57/10 116/206 |
| 2014/0145112 | A1* | 5/2014 | Ribi | C09B 57/10 252/299.1 |
| 2014/0273240 | A1 | 9/2014 | Georgeson et al. | |
| 2014/0328369 | A1 | 11/2014 | Flinn et al. | |
| 2015/0308907 | A1 | 10/2015 | Georgeson et al. | |
| 2015/0338296 | A1 | 11/2015 | Georgeson et al. | |
| 2016/0025662 | A1 | 1/2016 | Georgeson et al. | |
| 2016/0076947 | A1* | 3/2016 | Ribi | C09B 57/10 250/474.1 |
| 2016/0146747 | A1 | 5/2016 | Degaetano et al. | |
| 2016/0195437 | A1 | 7/2016 | Georgeson et al. | |
| 2016/0195470 | A1 | 7/2016 | Safai et al. | |
| 2018/0038792 | A1* | 2/2018 | Toivola | B64F 5/60 |

OTHER PUBLICATIONS

U.S. Appl. No. 14/670,394, filed Mar. 26, 2015, which is another application of applicant The Boeing Company.
U.S. Appl. No. 14/856,550, filed Sep. 16, 2015, which is another application of applicant The Boeing Company.

* cited by examiner

SYSTEMS FOR MONITORING THE ENVIRONMENTAL HISTORY OF A COMPONENT

CROSS REFERENCE TO RELATED APPLICATIONS

This nonprovisional patent application is related to contemporaneously filed U.S. nonprovisional patent application Ser. No. 15/231,691, titled "Multifunctional chromatic applique for monitoring of thermal events on a surface", having Attorney Docket No. 16-0419, filed on Aug. 8, 2016, and now U.S. Pat. No. 10,024,792 issued on Jul. 17, 2018.

FIELD

This disclosure relates to systems and methods for monitoring the environmental history of a component. More particularly, this disclosure relates to systems that include an indicator array of energy exposure indicator pads on a component surface configured to record the exposure of the component to impact, strain, or elevated temperature.

BACKGROUND

Many mechanical systems, such as commercial vehicles, manufacturing equipment, and other industrial systems, may be exposed to particularly energetic conditions, such as vibration, temperature extremes, impacts, or mechanical stresses. For example, even when on the ground aircraft may be exposed to significant stresses during cargo loading and unloading, as well as impacts from support vehicles and ground support equipment. During flight, stresses and/or impacts may result from shifting or improperly secured cargo. In addition, some system components may undergo thermal degradation when exposed to high temperatures. For example, some composite materials may be affected by thermal degradation, which may compromise the mechanical properties of the composite, including flexural strength, compression after impact, and interlaminar shear strength, among others.

It is therefore not uncommon for selected components of various industrial systems to be routinely inspected and evaluated during the operational lifetime of the component. Unfortunately, the integrity of one or more system components may be compromised without any accompanying visually detectable indication. In such cases a potentially damaged component may remain in service until a scheduled examination, or until it fails. Accordingly, there is a need for a non-destructive inspection technique that may readily and inexpensively indicate whether a system component has been subjected to an energetic event such as an impact and/or damaging high temperatures during operation. Such an indication may then trigger further evaluation of the system component, or even its replacement.

SUMMARY

The present disclosure provides indicator arrays for monitoring an environmental history of a component, methods of monitoring an environmental history of a component, and systems for monitoring an environmental history of a component.

In some aspects, the disclosure may provide an indicator array for monitoring an environmental history of at least a part of a component. The indicator array may include energy exposure indicator pads direct-printed onto a surface of the component in a geometric pattern. Each of the plurality of energy exposure indicator pads in the geometric pattern may include a mechanochromic material, a first thermochromic indicator responsive within a first temperature range, a second thermochromic indicator responsive within a second temperature range, and a third thermochromic indicator responsive within a third temperature range, provided that the first, second, and third temperature ranges are distinct from one another.

In some aspects, the disclosure may provide a method of monitoring an environmental history of a component, where the method may include direct-printing a geometric patterned array of energy exposure indicator pads on a surface of the component. Some energy exposure indicator pads in the geometric patterned array may include a mechanochromic material that may exhibit a first detectable optical response after the indicator pad is exposed to an impact or a strain. Some energy exposure indicator pads in the geometric patterned array may include a first thermochromic indicator that exhibits a second detectable optical response after the indicator pad is exposed to a temperature within a first temperature range. Some energy exposure indicator pads in the geometric patterned array may include a second thermochromic indicator that exhibits a third detectable optical response after the indicator pad is exposed to a temperature within a second temperature range. Some energy exposure indicator pads in the geometric patterned array may include a third thermochromic indicator that exhibits a fourth detectable optical response after the indicator pad is exposed to a temperature within a third temperature range. The first, second, and third temperature ranges may be distinct from one another. The method may further include exposing the component to an environmental condition, illuminating the geometric patterned array at one or more wavelengths selected to be appropriate to interrogate the energy exposure indicator pad materials included in the geometric patterned array, detecting one or more of the resulting first, second, third, and fourth detectable optical responses, and correlating the detected optical responses with the environmental history of the component.

In some aspects, the disclosure may provide a system for monitoring an environmental history of a component having a surface. The system may include an array of energy exposure indicator pads direct-printed onto the surface of the component in a geometric pattern. Each of the plurality of energy exposure indicator pads in the pattern may include a mechanochromic material, a first thermochromic indicator responsive to temperatures within a first temperature range, a second thermochromic indicator responsive to temperatures within a second temperature range, and a third thermochromic indicator responsive to temperatures within a third temperature range, provided that the first, second, and third temperature ranges are distinct from each other. The system may further include an excitation source configured to illuminate the energy exposure indicator pads at a wavelength selected to elicit a detectable optical response from the reporter materials, a detector configured to detect the one or more optical responses from the energy exposure indicator pads including the mechanochromic material and first, second, and third thermochromic indicators, and a processor coupled to the detector that may be configured to correlate the one or more detected optical responses with the environmental history of the component.

The features, functions, and advantages recited herein may be achieved independently in various aspects of the present disclosure, or may be combined in yet other aspects

DESCRIPTION

Figure 1:
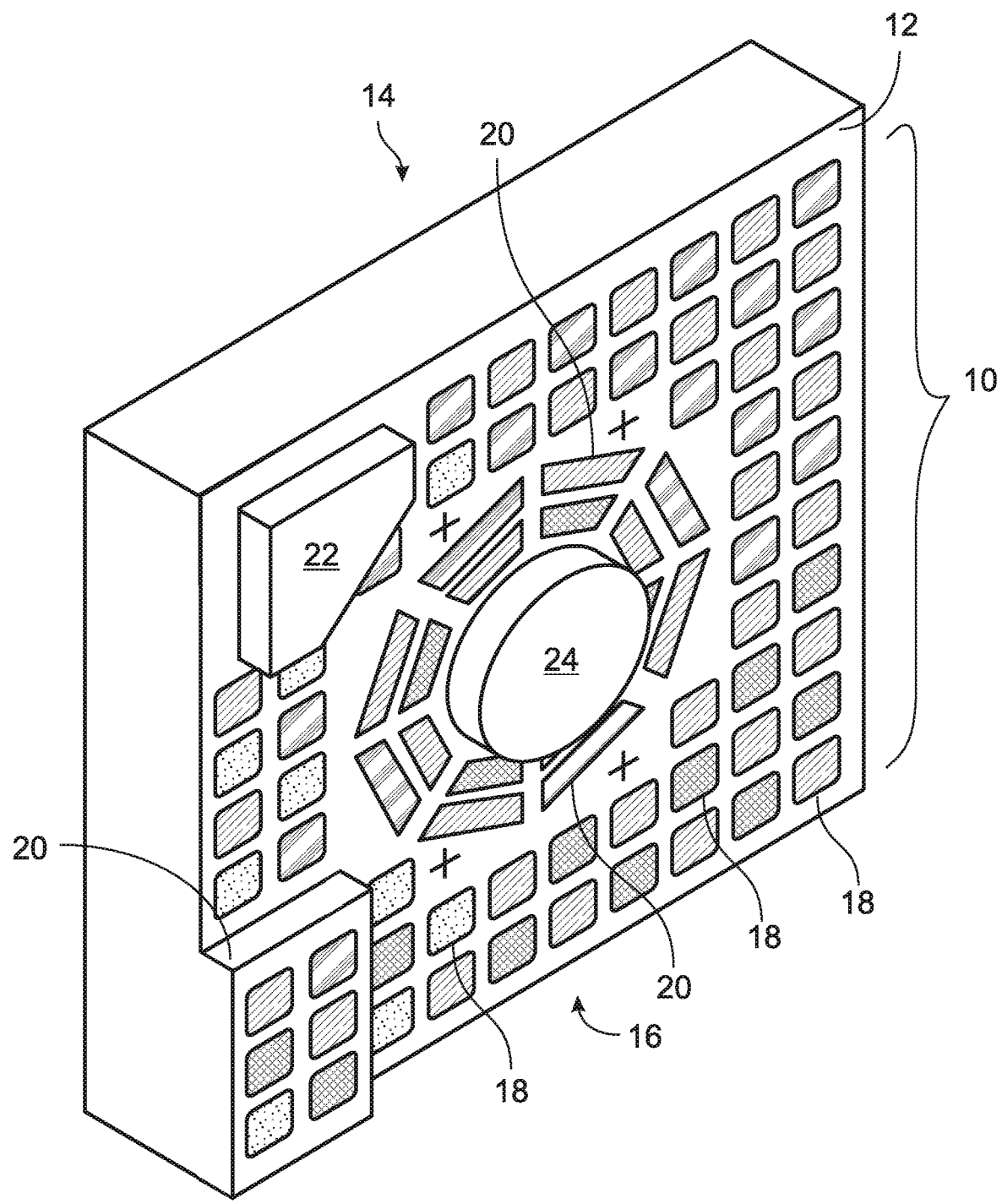
FIG. 1 is a semi-schematic isometric depiction of an indicator array according to an aspect of the present disclosure applied to a surface of a representative component.
Figure 2:
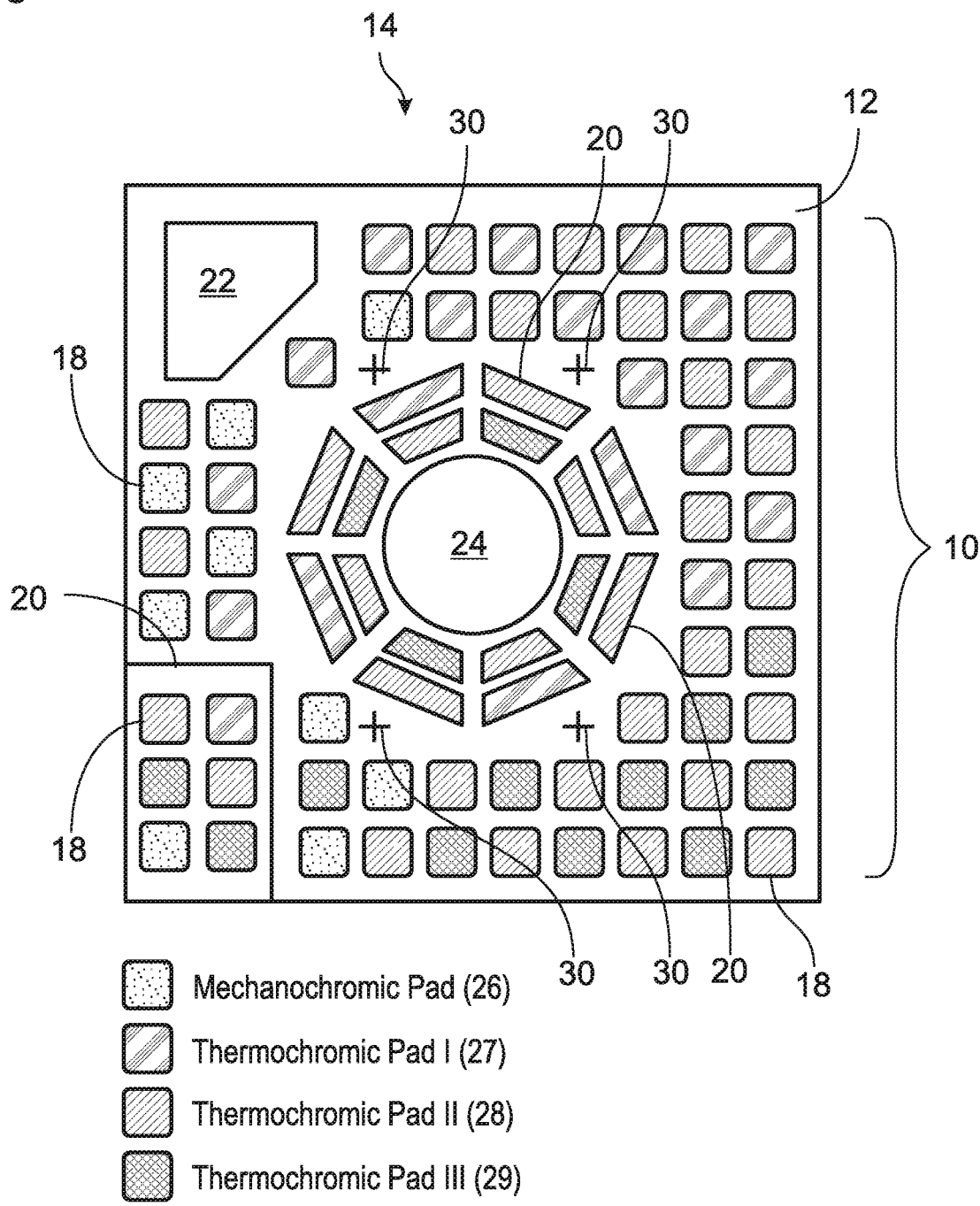
FIG. 2 is a front view of the indicator array of FIG. 1.

FIG. 1 is a semi-schematic isometric depiction of an indicator array 10 of the present disclosure applied to a surface 12 of a component 14. The indicator array 10 may include a geometric pattern 16 formed by the placement of a plurality of individual indicator pads 18. FIG. 2 depicts the indicator array 10 of FIG. 1 shown in a front elevation view.

The indicator array 10 is configured to monitor, or record, an environmental history of the component 14. By environmental history is meant the exposure of the component of interest to energetic events or conditions, such as impacts, physical stresses and strain, and elevated temperatures, among others. The environmental history may include a cumulative record of the exposure of the component of interest to such energetic events or conditions, such as cumulative exposure to high temperatures, or the cumulative effect of applied stresses and/or repeated impacts, or any combination thereof.

Each indicator pad 16 may include at least one reporter material configured to serve as an indicator of exposure to a preselected energetic condition and/or event. Suitable reporter materials may be selected to exhibit a detectable optical response after being exposed to a predetermined energetic event.

System Component

Component 14 may be any component of a system for which the ability to monitor and/or record an environmental history might be useful.

Component 14 may include a tool, such as a hand tool, a power tool, or tooling machinery, without limitation. For example, component 14 may include a bit, a blade, or a grinding surface where high stress and high temperatures are expected during operation. Indicator array 10 may be applied to a surface 12 adjacent a contact point between the tool and a workpiece. Alternatively or in addition, indicator array 10 may be applied to a surface 12 adjacent to the contact point, or to a housing for a tool.

Component 14 may include a container for transport of goods or materials, and the indicator array 10 may be applied to a surface of the container to record the environmental history of the container, and/or for the contents of the container.

Component 14 may include a component of a transportation system. For example, component 14 may include a component of a motor vehicle, such as an automobile or truck. Component 14 may include a component of a train, such as a locomotive or a rail car. Component 14 may include a component of an aircraft, such as a passenger aircraft or a cargo aircraft.

Where component 14 is a component of an aircraft, the indicator array 10 may be disposed on any exterior surface of the aircraft, or on any interior surface of the aircraft, such as the fuselage, a bulkhead, a strut, an engine housing, etc. Where indicator array 10 is disposed on an exterior surface of the aircraft, indicator array 10 may be disposed on a leading edge of a wing or stabilizer, or on a trailing edge of a wing or stabilizer. Indicator array 10 may be disposed on an engine component, or on a component of the aircraft landing gear, among other suitable component surfaces.

Where component 14 is present on an interior surface of an aircraft, component 14 may be a component of a subsystem of the aircraft, such as a ventilation system, a hydraulic system, a flight control system, and the like.

As shown in FIGS. 1 and 2, the surface 12 of component 14 may include one or more structures or surface features 20, 22, and 24. As is the case for surface feature 20, one or more indicator pads 16 may be applied directly onto the surface feature. Alternatively, or in addition, one or more indicator pads may be applied to the surface 12 of component 14 around or adjacent to a surface feature, such as is shown for surface features 22 and 24.

Reporter Materials

A suitable reporter material may be any material that exhibits a detectable optical response after being exposed to a predetermined energetic event. The predetermined energetic event may include any input of energy, such as kinetic energy, thermal energy, or spectral energy, among others, above a predetermined threshold level.

A detectable optical response means a change in, or occurrence of, a characteristic of the reporter material that is capable of being perceived by direct visual observation or instrumentally. Appropriate detectable responses may include a change in or the appearance of an optical property such as color, luminescence (including fluorescence), reflectance, or light scattering, among others. In one aspect of the disclosure, the reporter materials employed in the indicator pads 16 may exhibit a detectable response that is either the appearance of or a change in color, or the appearance of or a change in fluorescence. In one aspect of the disclosure, the reporter material exhibits a detectable optical response as a result of a substantially irreversible physical or chemical transformation during or as a result of an exposure to a predetermined energetic event.

For some reporter materials, the detectable optical response may be generated only by illuminating the reporter material with light having an appropriate wavelength. Where the detectable optical response includes the appearance of color, or a color change, the reporter material may be illuminated with visible light, such as may be provided by a conventional light source, such as lamp, a visible laser, or even sunlight, among others.

Alternatively, and particularly where the detectable optical response may include the appearance of, or a change in, fluorescence, the reporter material may exhibit the detectable optical response only after illumination by light having a shorter wavelength, more typically light in the ultra-violet (UV) region, sometimes referred to as actinic radiation.

Any indicator pad 16 may include one or more reporter materials, provided that the selected reporter materials, in combination, can serve as an appropriate indicator of exposure to one energetic condition, or provided that the selected reporter materials each serve as an appropriate indicator of exposure to their respective energetic conditions without interfering with any other reporter material in the same indicator pad. Alternatively, each indicator pad 16 may include a single reporter material, so that a given indicator pad may serve as an indicator for exposure to a selected energetic event.

Mechanochromic Reporter Materials

Where the reporter material includes a mechanochromic material, the reporter material may exhibit a detectable optical response after it is subjected to mechanical forces such as impacts, abrasion, and compression, among others. Such mechanochromic materials may include dyes and/or pigments, and the mechanical forces applied to the materials may change the degree or kind of intermolecular interactions that can occur between the dyes and/or pigments, resulting in a detectable optical response.

Although a variety of mechanochromic materials exist, mechanochromic materials useful for the indicator arrays of the present disclosure may undergo a substantially irreversible color change as a result of applied mechanical forces.

In an alternative aspect of the disclosure, the mechanochromic reporter material may include a plurality of indicator microspheres, or hollow microspheres filled with an indicating fluid. The microsphere walls may be configured to rupture when a mechanical force of sufficient intensity is applied to the material. In addition, the indicating fluid may be formulated to contain one or more dyes or pigments. As a result, an impact or the application of another mechanical force to the indicator pad 16 may result in the rupture of the microsphere walls, so that the indicating fluid may bleed or leak from the microsphere, resulting in a detectable optical response.

A given indicator pad 16 may include a single type of indicator microsphere. Alternatively, the indicator pad 16 may include a plurality of distinct microspheres exhibiting differing resistances to rupturing forces. That is, the force required to rupture a first set of microspheres filled with a first indicating fluid may be less than the force required to rupture a second set of microspheres willed with a second indicating fluid. The analysis of the detectable optical response for the presence of one or both indicating fluids may establish a lower limit for the amount of force applied to the indicator pad, and therefore applied to the component 14. Examples of such microsphere-containing reporter materials may be found in U.S. Pat. No. 8,691,383 to Georgeson et al., hereby incorporated by reference.

Thermochromic Reporter Materials

Thermochromic materials may undergo a change in color or luminescence due to a change in temperature. Although a variety of reversibly thermochromic materials exist, thermochromic materials particularly useful for the indicator arrays of the present disclosure may be configured to undergo a substantially irreversible color change as a result of exposure to a sufficiently high temperature.

The thermochromic reporter materials may exhibit a change in spectral properties as a result of any suitable molecular mechanism. For example, exposure of the reporter material to high temperatures may result in an intramolecular rearrangement with accompanying color change. In another aspect, the reporter material includes multiple dye moieties in a conformation that prevents energy transfer between the dye moieties, and exposure to high temperatures results in a new conformation in which energy transfer is permitted, resulting in new and distinct spectral properties.

Some suitable thermochromic reporter materials may be commercially available under the brand name AJNDE16, AJNDE17, AJNDE30, AJNDE31, AJNDE32, AJNDE33, and AJNDE34, from SOLUXRA, LLC. Additional irreversible thermochromic materials may be obtained commercially from other sources such as LCRHALLCREST, and OLIKROM, among others.

Indicator Pads

The reporter material present in any given indicator pad 18 may be applied as a component of a matrix. The matrix may be any material capable of supporting the reporter material without adversely affecting the ability of the reporter material to exhibit a detectable optical response, or adversely affecting the ability to detect and/or quantify the detectable optical response. The matrix may be selected to retain and protect the reporter material for a useful lifetime of exposure to environmental conditions. The matrix may be selected to be substantially transparent at the wavelengths of light necessary to interrogate and/or excite the reporter material.

In some aspects of the disclosure, the matrix may be one or more of a thermoset polymer, a thermoplastic polymer, and a sol-gel. In another aspect of the disclosure, the matrix may include a resin, such as an epoxy resin, and a curing agent. The matrix and selected reporter material may be applied in various thicknesses as required by the matrix material, the concentration of reporter material, and the predicted wear-resistance of the resulting indicator pad in consideration of the anticipated wear on surface coatings on the intended component.

By careful selection of the reporter materials used, the matrix materials used, and the size and thickness of the indicator pad applied to a given surface, the resulting indicator array may exhibit an increased or decreased visibility. If desired, an indicator array that is substantially non-detectable may be applied, that only becomes detectable upon illumination with light of an appropriate wavelength. Alternatively, additional dyes or colorants may be added to the matrix to render the resulting indicator array more visible to the eye, provided that the additional dyes or colorants do not interfere with either the excitation of, or detecting the emission from, the reporter materials.

Patterned Array of Indicator Pads

The indicator pads 18 may be arranged in a desired spatial distribution corresponding to the geometric pattern 16 defined by the indicator array 10. While most indicator pads 18 are depicted in FIGS. 1 and 2 as having a rounded square shape, it should be evident that any suitable shape of indicator pad may be employed. The individual pads may be shaped so that they may be arranged in a highly ordered array, such as an array of approximately square or rectangular indicator pads that are disposed in a series of rows and columns. The individual pads may be shaped so that they may be arranged in a high-density pattern, such as a close-packed array of hexagonal indicator pads. In another aspect of the disclosed indicator array, the indicator pads may be shaped so that they can be arranged in a desired shape. For example, the indicator pads 20 of FIGS. 1 and 2 are irregular tetragons of varying size so that they may be arrayed around the circular surface feature 24. In addition to having varying shapes and sizes of indicator pads, the indicator array 10 may incorporate any suitable spacing between adjacent indicator pads 18. As shown in FIGS. 1 and 2, individual indicator pads 18 are spaced somewhat apart, however individual indicator pads 18 may be applied to surface 12 so that each pad substantially abuts its closest neighbors, with essentially no intervening space.

The indicator array 10 may include a plurality of distinct indicator pads incorporating a plurality of distinct reporter materials. In one aspect of the present disclosure, the indicator array 10 includes one or more indicator pads that include a mechanochromic reporter material, and one or more indicator pads that include a thermochromic indicator. The indicator array 10 may include a combination of multiple distinct mechanochromic reporter materials and/or multiple distinct thermochromic indicators. Where the indicator array includes multiple mechanochromic reporter materials, the energy threshold required to trigger a detectable optical response may be distinct for each mechanochromic reporter material, and the resulting indicator array may thereby provide a record of energetic impacts that include an indication of the relative severity of the impact.

Similarly, where the indicator array 10 includes multiple distinct thermochromic indicators, the thermal range for each thermochromic indicator may be distinct from the thermal range for each other thermochromic indicator in that array. By thermal range is meant the temperature range within which a selected thermochromic indicator will exhibit a detectable optical response. Although the thermal ranges for the thermochromic indicators may overlap, the individual thermochromic indicators may be selected so that the lower and upper limits of the temperature range for each thermochromic indicator is sufficiently different from each other thermochromic indicator in the indicator array 10 that the optical response of each thermochromic indicator will yield useful information about the history of thermal exposure of the component 14.

In one aspect of the present disclosure, the indicator array 10 includes one or more indicator pads that include a mechanochromic reporter material, one or more indicator pads that include a first thermochromic indicator that is responsive within a first defined temperature range, one or more indicator pads that include a second thermochromic indicator that is responsive within a second defined temperature range, and one or more indicator pads that include a third thermochromic indicator that is responsive within a third defined temperature range.

Where the indicator array 10 includes multiple distinct thermochromic indicators, the thermal range for each thermochromic indicator may be distinct from the thermal range for each other thermochromic indicator in that array. By thermal range is meant the temperature range within which a selected thermochromic indicator will exhibit a detectable optical response. Although the thermal ranges for the thermochromic indicators may overlap, the individual thermochromic indicators may be selected so that the lower and upper limits of the temperature range for each thermochromic indicator is sufficiently different from each other thermochromic indicator in the indicator array 10 that the optical response of each thermochromic indicator will yield useful information about the history of thermal exposure of the component 14.

For example, as depicted in FIGS. 1 and 2, indicator array 10 includes thermochromic indicator pads 27, 28, and 29, which include thermochromic materials I, II, and III, respectively. Thermochromic materials I, II, and III may be selected so that thermochromic material I exhibits a detectable optical response when exposed to a temperature within a first temperature range, thermochromic material II exhibits a detectable optical response when exposed to a temperature within a second temperature range, and thermochromic material III exhibits a detectable optical response within a third temperature range. The first, second, and third temperature ranges may be distinct, in that while there may be some overlap in the ranges, each temperature range is different from each other temperature range. Typically, the first temperature range is lower than, or at least includes some subrange of temperatures lower than the second temperature range, and the second temperature range is lower than, or at least includes some subrange of temperatures lower than the third temperature range.

The indicator array 10 may incorporate a mechanochromic material and first, second, and third thermochromic indicators so that their corresponding indicator pads 16 are interspersed across the geometric pattern 14 defined by the indicator array 10. The distinct types of indicator pads may be interspersed in such a way that the mechanochromic material and first, second, and third thermochromic indicators are evenly distributed across the geometric pattern 14.

Alternatively, the mechanochromic material and first, second, and third thermochromic indicators may be disposed within the indicator array 10, and on the surface of component 14, so that the appropriate type of indicator pad 18 is on or near a portion of the component 14 where a particular type of energy exposure may be likely to occur. That is, thermochromic indicator pads are disposed where there may be exposure to higher temperatures, and mechanochromic indicator pads are disposed where there may be an increased likelihood of impact or strain.

For example, the indicator array 10 may be applied to the component 10 in such a manner that at least some indicator pads that include a mechanochromic material are applied on or near a selected portion of the surface 12 of the component 14 and configured to record or indicate the occurrence of a localized impact on, or strain of, that portion of the surface 14 of the component 14. For example, the geometric patterned indicator array 10 of FIGS. 1 and 2 includes a greater concentration of mechanochromic indicator pads 26 on or near structure 20 of component 14, so that impacts, stresses, or strains involving that portion of the component 14 may be recorded.

Alternatively, or in addition, the indicator array 10 may be applied to the component 14 in such a manner that at least some indicator pads that include a thermochromic material are applied on or near an area of interest on the surface 12 of the component 14, so that the array at least overlaps with the area of interest. In this way the indicator pads 16 may be configured to record or indicate a localized maximum temperature of at least a portion of the area of interest. For example, an area of interest for component 14 is coincident with structure 24. The geometric patterned indicator array 10 of FIGS. 1 and 2 therefore may include a greater concentration of thermochromic indicator pads 27, 28, and 29 arranged around structure 24 of component 14, so that the thermal exposure of at least that portion of the component 14 may be recorded.

Furthermore, the portion of indicator array 10 near the area of interest surrounding structure 24 includes a higher relative concentration of the thermochromic indicator pads 29 having the highest temperature range, while further from the area of interest the geometric pattern includes a higher relative concentration of the thermochromic indicator pads 27 and 28, which have lower temperature ranges.

The indicator array 10 may further include one or more registration indicia 30. The registration indicia may include one or more marks on the surface 12 of the component 14 that may have a fixed position relative to the placement of indicator pads 18 and or to the geometric pattern 16 of the indicator array 10. That is, a user may be able to identify a particular indicator pad 16 within the array 10 by noting the position of that particular pad with respect to one or more registration indicia.

Although the registration indicia 30 may be applied to or formed in the surface 12 of component 14 by any suitable method, it may be convenient to apply the registration indicia 30 using the same process that may be used to apply the indicator array 10. Alternatively, one or more registration indicia 30 may be applied to the surface 12 and the indicia may be used to more accurately place the indicator array 10 itself.

The registration indicia 30 may be useful for manual scanning of the indicator array 10. Alternatively, or in addition, the one or more registration indicia may be used in conjunction with an optical scanner in order to align the scanner appropriately with the geometric pattern 16 of the indicator array 10, for example by providing a reference point that a machine vision system may use to properly position a detector to capture an image of the indicator array 10.

Digital Pattern

This example describes an illustrative method of designing a digital model for the indicator array 10 or the present disclosure for application to a desired surface 12 of a component 14.

Aspects of the digital model may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

A program or application that is capable of carrying out Computer Aided Design (CAD) may be useful for creating a digital model for a desired indicator array and indicator array pattern. In particular, a program or application that is capable of generating a digital CAD model and facilitates subsequent Computer Aided Manufacturing (CAM) methods for direct writing the geometric pattern onto the component surface may be particularly suitable for the purposes of the present disclosure.

An illustrative digital design process may begin by defining a footprint of the component 14 to be covered by the indicator array, including the topology of the surface of the component within the footprint. The topology of the surface includes the shape and structure of the surface, that is whether it is substantially flat or includes a degree of curvature, as well as the presence of any surface features. The desired digital model for the indicator array may then be created in conjunction with the digital model of the footprint on the component surface to which it may be applied.

The material used to form each indicator pad 16, its desired thickness and overall shape may be selected so that the individual mechanochromic and thermochromic reporter pads are disposed in the desired order, proximity, and orientation to surface features, if present, or areas of particular interest on or in the component 14. The resulting digital model of the desired indicator array may then be used to control an appropriate CNC direct write apparatus that may apply the desired indicator array to the component of interest.

The calculations to create the desired digital model of the footprint and/or the indicator array of the present disclosure may be carried out on a suitable data processing system, which may include a communications framework to provide communications between one or more processor units, memory, persistent storage, communications units, input/output (I/O) units, and displays.

Instructions for an operating system, applications, and/or programs may be located in one or more storage devices in communication with the one or more processor units through the communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present disclosure may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Direct Write

The indicator pads 16 may be applied to the surface 12 of component 14 by utilizing a direct write process. Direct write processes, also known as direct printing, include a family of fabrication processes that may permit maskless patterning of materials directly onto the desired surface using any of a variety of computer-controlled deposition techniques.

Any deposition technique that is compatible with the physical characteristics of the reporter material and matrix combination being applied may be an appropriate deposition method for the purposes of the present disclosure. Useful deposition techniques may include ink-jet printing, bubble jet printing, fused deposition, micropen writing, microdispensing, thermal spraying (including mesoplasma-based thermal spraying), and aerosol jet deposition, among others.

In one aspect of the direct write process, the direct write apparatus may be a CNC direct write apparatus, where the deposition process is controlled by an associated processor or computer system. In such cases the direct write process serves to apply an array of indicator pads that substantially correspond to a digital model prepared beforehand for the surface of interest, as discussed above.

Where the component 14 of interest may be readily transported, the component 14 may be brought to an appropriate deposition apparatus so that the desired indicator array 10 may be applied to the component. Alternatively, or in addition, the deposition apparatus may be portable and brought to the location of the component 14 either before or after it has been incorporated into a larger structure or mechanism. The use of a portable deposition apparatus may be advantageous where it may be desirable to apply the indicator array 10 onto a surface 12 of a component 14 after it has been incorporated into a mechanical system. For example, a portable deposition apparatus built into a wheeled cart or trolley could be wheeled near or into an aircraft fuselage during its construction so that appropriate indicator arrays could be applied to a surface of an existing bulkhead, for example.

Method

Figure 3:
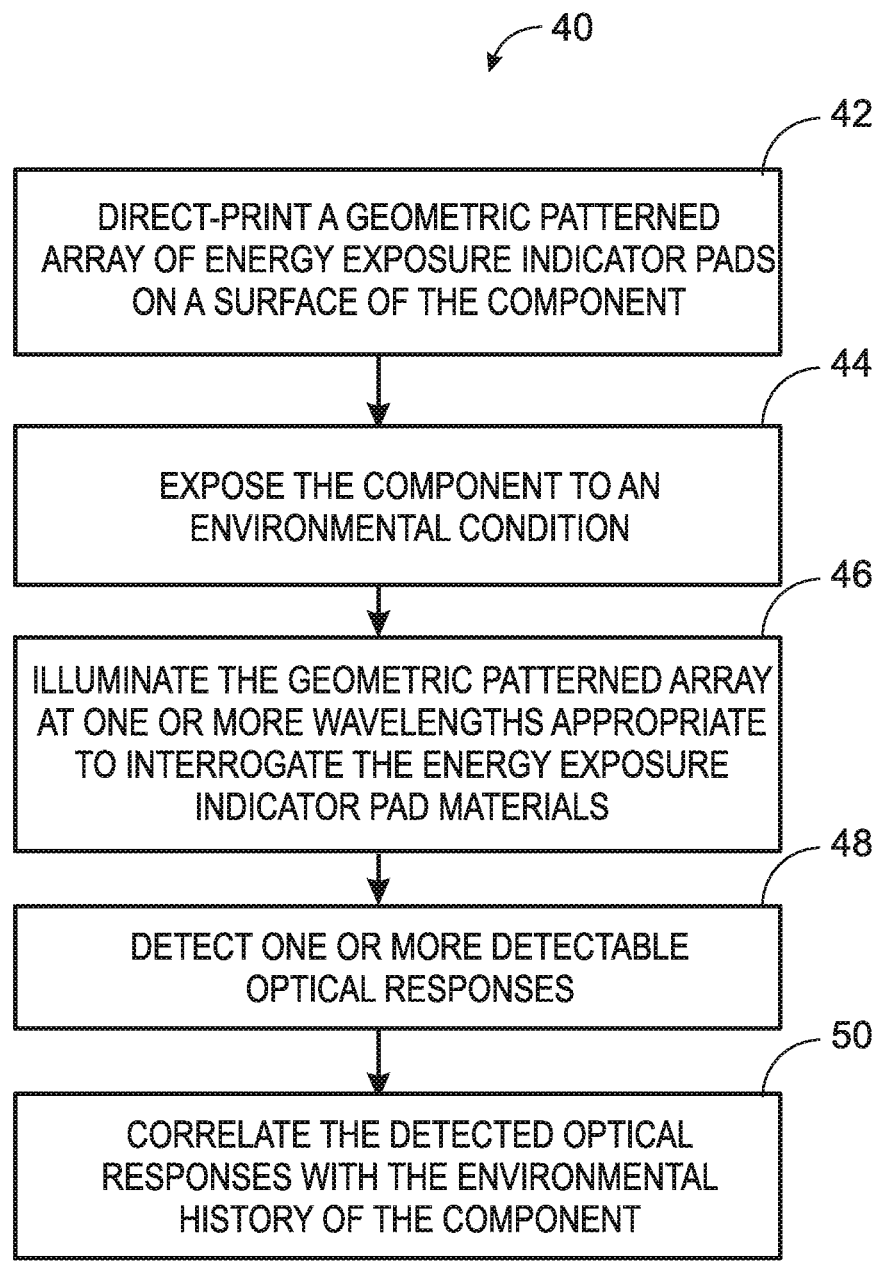
FIG. 3 is a flowchart illustrating a method of monitoring an environmental history of a component according to an aspect of the present disclosure.

FIG. 3 illustrates a flowchart 40 of an illustrative nondestructive method of monitoring an environmental history of a component, where the method includes direct-printing a geometric patterned array of energy exposure indicator pads as disclosed herein on a surface of the component, at 42; exposing the component to an environmental condition, at 44; illuminating the geometric patterned array at one or more wavelengths appropriate to interrogate the energy exposure indicator pad materials at 46; detecting one or more detectable optical responses of the reporter materials in the indicator pads, at 48; and correlating the detected optical responses with the environmental history of the component.

The detectable optical response generally may include a change in, or an occurrence of, a visible or luminescent signal that is detectable by direct visual observation and/or by suitable instrumentation. Although the detectable optical response may be an appearance and/or change in the color of an indicator pad, typically the detectable optical response is an appearance and/or change in luminescence from the reporter material of the individual indicator pad. Such changes in luminescence may include change in the intensity, polarization, lifetime, and/or excitation or emission wavelength distribution of the luminescence. For example, where a particular selected indicator pad has been exposed to a sufficiently energetic environmental condition, that exposure may be detected and/or quantified as an appearance of, or increase of, indicator pad luminescence.

The selection of an appropriate wavelength for illuminating the indicator array 10 may depend upon the excitation spectra of the reporter materials after they have been exposed to a sufficiently energetic event or condition. Although a visible light source may be sufficient where the detectable optical response is a color change, it may be advantageous to utilize reporter materials that become converted to a fluorescent material upon exposure to a sufficiently energetic event or condition. In such cases the patterned array of indicator pads may be exposed to an ultraviolet light source that emits in a wavelength region that may be absorbed by the fluorescent material. The irradiation (or illumination, or interrogation) of the indicator pads may result in a fluorescence emission that may appear as a discoloration of the indicator pad in the form of one or both of a shift in color and/or a change in intensity of color of the indicator pad as a result of exposure to the energetic event or condition.

Upon detection of the detectable optical response of the individual indicator pads of the indicator, the detected optical responses may be correlated with the environmental history of the component to which the indicator pads were applied. This correlation may include measuring the optical properties of the detectable optical response, such as emission wavelength and/or emission intensity, and comparing the measured optical properties with a baseline value recorded for the relevant reporter material, so that deviation of the detectable optical response from the baseline value may be correlated with exposure to an energetic event. Alternatively, or in addition, a calibration curve may be created by exposing a given reporter material to conditions of incrementally increasing energetic exposure, and recording the resulting optical properties of the reporter material. The measured characteristics of a detected optical response may then be compared to the resulting calibration curve, and a value for the energy exposure experienced by the indicator pad may be calculated.

Additionally, the location of the indicator pads under interrogation may be helpful in determining the environmental history of the component. For example, when illuminated by ultraviolet light, those indicator pads 26 that may fluoresce and exhibit a discoloration in the form of a shift in color and/or a change in intensity of the color of the indicator pad may reflect the application of an externally applied stress, such as an impact or shock above a predetermined intensity level, and the location of those indicator pads 26 that display such a change in appearance may serve to help identify a location on surface 12 of component 14 where the impact or shock occurred.

Similarly, where indicator pads 27, 28, and/or 29 may be illuminated at an appropriate wavelength and exhibit a discoloration, such as the appearance of or a change in intensity of color of fluorescence, such changes may reflect the application of elevated temperatures above the minimum temperature of the temperature range for that indicator pad, and the location of those indicator pads 27, 28, and/or 29 that display such changes in appearance may serve to localize where on surface 12 of component 14 the elevated temperatures occurred. Furthermore, by evaluating whether only indicator pads 27 exhibit such changes (corresponding to temperatures in the first temperature range), or one or more of indicator pads 28 and 29 also exhibit such changes (corresponding to temperatures in the second and third temperature ranges), the thermal exposure history of the component, and the location and degree of thermal exposure, may be identified.

Monitoring System

The indicator arrays of the present disclosure may be advantageously incorporated into a system for monitoring an environmental history of a component.

Figure 4:
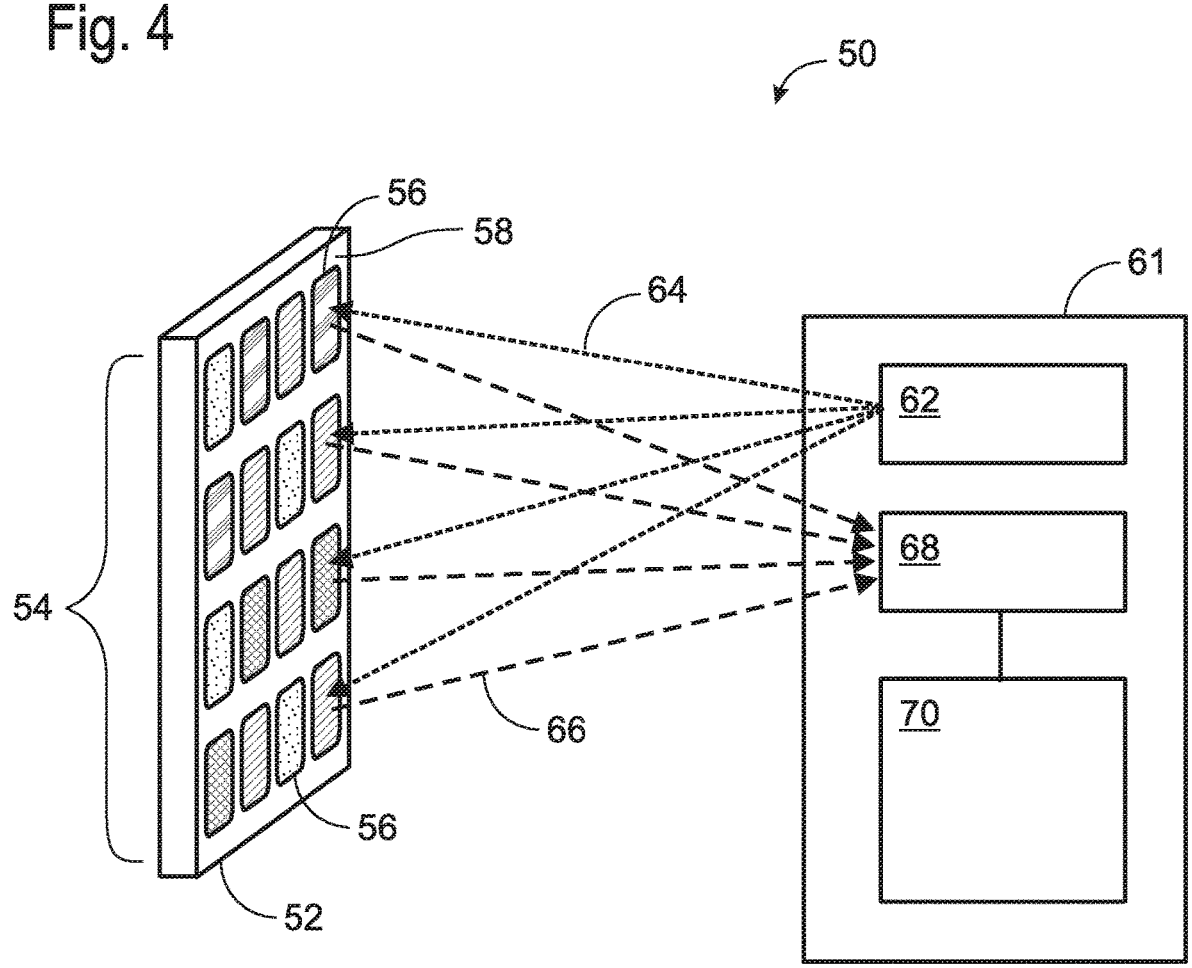
FIG. 4 is a schematic depiction of a system for monitoring an environmental history of a component, according to an aspect of the present disclosure.

An exemplary system 50 for monitoring an environmental history of a component 52 is depicted schematically in FIG. 4. The system 50 may include an array 54 of energy exposure indicator pads 56 direct-printed onto a surface 58 of the component 52, as described above. In a particular example, the geometric pattern of the indicator array 54 may include: A plurality of energy exposure indicator pads that incorporate a mechanochromic reporter material; a plurality of energy exposure indicator pads that incorporate a first thermochromic indicator responsive to temperatures within a first temperature range; a plurality of energy exposure indicator pads that incorporate a second thermochromic indicator responsive to temperatures within a second temperature range; and a plurality of energy exposure indicator pads that incorporate a third thermochromic indicator responsive to temperatures within a third temperature range. The exemplary system may include first, second and third thermochromic indicators having first, second, and third temperature ranges that are distinct from one other.

The exemplary system may further include a detection apparatus 61, where the detection apparatus may include an excitation source 62 capable of illuminating at least a portion of the energy exposure indicator pads with light 64 at a wavelength that elicits a detectable optical response 66 from those indicator pads.

The detection apparatus 61 may further include a detector 68 configured to detect one or more optical responses 66 from the energy exposure indicator pads 56, and more specifically from one or more of the mechanochromic reporter material and first, second, and third thermochromic indicators.

The detection apparatus 61 may further include a processor 70, functionally coupled to the detector. Processor 70 may be configured to store and/or analyze the data obtained by detector 68, and typically processor 70 is capable of correlating the one or more detected optical responses with the environmental history of the component.

The detection apparatus 61 may be capable of simply detecting the detectable optical response, or detection apparatus 61 may be capable of quantifying the detectable optical response. Where the detection apparatus simply detects the optical response of an indicator pad, the existence of the response is merely confirmed. Where the optical response is quantified, the detected optical response generally includes a quantifiable (e.g., numerically reportable) value such as an intensity, polarization, and/or other optical property.

Excitation source 62 of the detection apparatus 61 may include any light source capable of generating a detectable optical response from an indicator pad 56 that has been exposed to the preselected energetic event or environment. The indicator pads may be illuminated by a light source such as for example an arc lamp, a fluorescent bulb, or even an incandescent bulb. Additional suitable excitation sources may include, for example, fixed, hand-held, or movable lamps, including mercury arc lamps and xenon lamps, and laser light sources such as argon-ion lasers, diode lasers, and Nd-YAG lasers, among others.

Although the detectable optical response 66 of the reporter material may be detected by the human eye, for example by simple observation, the detector 68 may include one or more of a CCD camera, a video cameras, photographic film, or other light-sensing apparatus.

Detection apparatus 61 may be stationary with respect to the indicator pad array 54, or it may scan along the surface of the array 54. Scanning may be accomplished by translating one or both of the excitation source 61 and detector 68 along the array 54, or by using a scanning mechanism such as for example a pivoting or rotating mirror to scan the array 54.

EXAMPLES

This section describes additional aspects and features of the systems and methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An indicator array for monitoring an environmental history of at least a part of a component, comprising an array of energy exposure indicator pads direct-printed onto a surface of the component in a geometric pattern;
 wherein a plurality of energy exposure indicator pads in the geometric pattern include a mechanochromic material;
 a plurality of energy exposure indicator pads in the geometric pattern include a first thermochromic indicator responsive within a first temperature range;
 a plurality of energy exposure indicator pads in the geometric pattern include a second thermochromic indicator responsive within a second temperature range; and
 a plurality of energy exposure indicator pads in the geometric pattern include a third thermochromic indicator responsive within a third temperature range;
 provided that the first, second, and third temperature ranges are distinct from each other.

A2. The indicator array of claim A1, wherein the energy exposure indicator pads including the mechanochromic material and first, second and third thermochromic indicators are interspersed across the geometric pattern.

A3. The indicator array of claim A1, wherein the energy exposure indicator pads including the mechanochromic material and first, second and third thermochromic indicators are evenly distributed across the geometric pattern.

A4. The indicator array of claim A1, wherein the energy exposure indicator pads including the mechanochromic material are configured to indicate a localized impact on or strain of the component.

A5. The indicator array of claim A1, wherein the energy exposure indicator pads including a thermochromic material are configured to indicate a localized maximum temperature of the component.

A6. The indicator array of claim A1, wherein the component includes an area of interest, and the array of energy exposure indicator pads is direct-printed onto the surface of the component in a geometric pattern that at least overlaps with the area of interest.

A7. The indicator array of claim A6, wherein the array of energy exposure indicator pads is direct-printed onto the surface of the component in a geometric pattern that is substantially centered on the area of interest.

A8. The indicator array of claim A6, wherein the geometric pattern features a higher relative concentration of the thermochromic indicator pads having a highest temperature range on or near the area of interest, and the geometric pattern features a higher relative concentration of the thermochromic indicator pads having a lowest temperature range further from the area of interest.

A9. The indicator array of claim A1, wherein the component includes a surface feature, and the array of energy exposure indicator pads is direct-printed onto the surface feature of the component.

A10. The indicator array of claim A1, wherein one or more of the energy exposure indicator pad materials is a luminescent reporter material.

B1. A method of monitoring an environmental history of a component, comprising:
direct-printing a geometric patterned array of energy exposure indicator pads on a surface of the component;
 wherein a plurality of energy exposure indicator pads in the geometric patterned array include a mechanochromic material that exhibits a first detectable optical response after exposure to an impact or a strain;
 a plurality of energy exposure indicator pads in the geometric patterned array include a first thermochromic indicator that exhibits a second detectable optical response when exposed to a temperature within a first temperature range;
 a plurality of energy exposure indicator pads in the geometric pattern include a second thermochromic indicator that exhibits a third detectable optical response when exposed to a temperature within a second temperature range;
 a plurality of energy exposure indicator pads in the geometric pattern include a third thermochromic indicator that exhibits a fourth detectable optical response when exposed to a temperature within a third temperature range;
  provided that the first, second, and third temperature ranges are distinct from each other;
exposing the component to an environmental condition;
illuminating the geometric patterned array at one or more wavelengths appropriate to interrogate the energy exposure indicator pad materials therein;
detecting one or more of the first, second, third, and fourth detectable optical responses;
correlating the detected optical responses with the environmental history of the component.

B2. The method of claim B1, wherein detecting one or more of the first, second, third, and fourth detectable optical responses includes detecting one or more distinct optical responses.

B3. The method of claim B1, further comprising localizing the first detectable optical response and correlating the localized first detectable optical response with a location of an impact on or strain of the component.

B4. The method of claim B1, further comprising correlating the second, third, and fourth detectable optical responses with a thermal history of the component.

B5. The method of claim B1, further comprising localizing the second, third, and fourth detectable optical responses and correlating the localized second, third, and fourth detectable optical responses with a spatial thermal history of the component.

B6. The method of claim B1, wherein detecting one or more of the first, second, third, and fourth detectable optical responses includes detecting a luminescence response.

B7. The method of claim B6, wherein detecting a luminescence response further comprises detecting at least one of a shift in luminescence wavelength and a change in luminescence intensity.

B8. The method of claim B1, wherein direct-printing the geometric patterned array of energy exposure indicator pads includes interspersing energy exposure indicator pads that include the mechanochromic material and first, second and third thermochromic indicators across the geometric patterned array.

B9. The method of claim B1, wherein direct-printing the geometric patterned array of indicator pads includes evenly distributing the energy exposure indicator pads that include the mechanochromic material and first, second and third thermochromic indicators within the geometric patterned array.

C1. A system for monitoring an environmental history of a component having a surface, comprising:
an array of energy exposure indicator pads direct-printed onto a surface of the component in a geometric pattern;
 wherein a plurality of energy exposure indicator pads in the geometric pattern include a mechanochromic material;
 a plurality of energy exposure indicator pads in the geometric pattern include a first thermochromic indicator responsive to temperatures within a first temperature range;
 a plurality of energy exposure indicator pads in the geometric pattern include a second thermochromic indicator responsive to temperatures within a second temperature range;
 a plurality of energy exposure indicator pads in the geometric pattern include a third thermochromic indicator responsive to temperatures within a third temperature range;
  provided that the first, second, and third temperature ranges are distinct from each other;
an excitation source configured to illuminate the energy exposure indicator pads at a wavelength selected to elicit a detectable optical response from the reporter materials;
a detector configured to detect one or more optical responses from the energy exposure indicator pads including the mechanochromic material and first, second and third thermochromic indicators;
and a processor coupled to the detector configured to correlate the one or more detected optical responses with the environmental history of the component.

C2. The system of claim C1, wherein correlating the one or more detected optical responses includes comparing the detected optical responses with one or more calibration curves that correlate the detected optical responses with the environmental history of the component.

Advantages, Features, Benefits

The presently disclosed indicator pads, indicator arrays, methods of monitoring environment history, and systems for monitoring environmental history offer substantial benefits and improvements over current methods of nondestructive testing. As the indicator arrays may be applied by a direct writing process, the indicator arrays of the present disclosure may be applied on virtually any surface. Furthermore, by careful selection of the reporter materials used in the indicator arrays, they may be used to record any of a wide variety of collisions, impacts, abrasions, and stresses. By employing thermochromic reporter materials, exposure to thermal events such as a high ambient temperatures, or exposure to hot engine exhaust can be monitored and/or recorded. The presently disclosed indicator arrays may be useful in a variety of industries, including manufacturing and transportation industries.

The present arrays may be particularly useful in the aircraft industry, as custom tailored arrays may be applied directly to individual airplane parts, and provide important data on the thermal history of that part. The ability to quickly evaluate thermal exposure may allow heat-damaged parts to be quickly identified and replaced prior to a potential failure.

For at least these reasons, the presently disclosed indicator arrays, systems, and methods may greatly streamline and/or enhance the monitoring of industrial components for exposure to undesirable stresses and thermal events, reducing costs and enhancing safety.

CONCLUSION

The disclosure set forth above may encompass multiple distinct inventions with independent utility. Although each of these inventions has been disclosed in its preferred form(s), the specific examples thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the present disclosure.

What is claimed is:

1. An indicator array for monitoring an environmental history of at least a part of a component, comprising:
an array of energy exposure indicator pads direct-printed onto a surface of the component in a geometric pattern; wherein
a plurality of energy exposure indicator pads in the geometric pattern include a mechanochromic material;
a plurality of energy exposure indicator pads in the geometric pattern include a first thermochromic indicator responsive within a first temperature range;
a plurality of energy exposure indicator pads in the geometric pattern include a second thermochromic indicator responsive within a second temperature range; and
a plurality of energy exposure indicator pads in the geometric pattern include a third thermochromic indicator responsive within a third temperature range;
provided that the first, second, and third temperature ranges are distinct from each other.

2. The indicator array of claim 1, wherein the energy exposure indicator pads including the mechanochromic material and first, second, and third thermochromic indicators are interspersed across the geometric pattern.

3. The indicator array of claim 1, wherein the energy exposure indicator pads including the mechanochromic material and first, second, and third thermochromic indicators are evenly distributed across the geometric pattern.

4. The indicator array of claim 1, wherein the energy exposure indicator pads including the mechanochromic material are configured to indicate a localized impact on, or strain of, at least a portion of the component.

5. The indicator array of claim 1, wherein the energy exposure indicator pads including a thermochromic material are configured to indicate a localized maximum temperature of at least a portion of the component.

6. The indicator array of claim 1, wherein the component includes an area of interest, and the array of energy exposure indicator pads is direct-printed onto the surface of the component in a geometric pattern that at least overlaps with the area of interest.

7. The indicator array of claim 6, wherein the geometric pattern features a higher relative concentration of the thermochromic indicator pads having a highest temperature range on or near the area of interest, and the geometric pattern features a higher relative concentration of the thermochromic indicator pads having a lowest temperature range further from the area of interest.

8. The indicator array of claim 1, wherein the component includes a surface feature, and the array of energy exposure indicator pads is direct-printed onto the surface feature of the component.

9. The indicator array of claim 1, wherein one or more of the energy exposure indicator pad materials is a luminescent reporter material.

10. A method of monitoring an environmental history of a component, comprising:
direct-printing a geometric patterned array of energy exposure indicator pads on a surface of the component;
wherein a plurality of energy exposure indicator pads in the geometric patterned array include a mechanochromic material that exhibits a first detectable optical response after exposure to an impact or a strain;
a plurality of energy exposure indicator pads in the geometric patterned array include a first thermochromic indicator that exhibits a second detectable optical response when exposed to a temperature within a first temperature range;
a plurality of energy exposure indicator pads in the geometric pattern include a second thermochromic indicator that exhibits a third detectable optical response when exposed to a temperature within a second temperature range;
a plurality of energy exposure indicator pads in the geometric pattern include a third thermochromic indicator that exhibits a fourth detectable optical response when exposed to a temperature within a third temperature range;
provided that the first, second, and third temperature ranges are distinct from each other;
exposing the component to an environmental condition;
illuminating the geometric patterned array at one or more wavelengths appropriate to interrogate the energy exposure indicator pad materials therein;
detecting one or more of the first, second, third, and fourth detectable optical responses;
correlating the detected optical responses with the environmental history of the component.

11. The method of claim 10, wherein detecting one or more of the first, second, third, and fourth detectable optical responses includes detecting one or more distinct optical responses.

12. The method of claim 10, further comprising localizing the first detectable optical response and correlating the localized first detectable optical response with a location of an impact on or strain of the component.

13. The method of claim 10, further comprising correlating the second, third, and fourth detectable optical responses with a thermal history of the component.

14. The method of claim 10, further comprising localizing the second, third, and fourth detectable optical responses and correlating the localized second, third, and fourth detectable optical responses with a spatial thermal history of the component.

15. The method of claim 10, wherein detecting one or more of the first, second, third, and fourth detectable optical responses includes detecting a luminescence response.

16. The method of claim 15, wherein detecting a luminescence response further comprises detecting at least one of a shift in luminescence wavelength and a change in luminescence intensity.

17. The method of claim 10, wherein direct-printing the geometric patterned array of energy exposure indicator pads includes interspersing energy exposure indicator pads that include the mechanochromic material and first, second and third thermochromic indicators across the geometric patterned array.

18. The method of claim 10, wherein direct-printing the geometric patterned array of indicator pads includes evenly distributing the energy exposure indicator pads that include the mechanochromic material and first, second and third thermochromic indicators within the geometric patterned array.

19. A system for monitoring an environmental history of a component having a surface, comprising:
  an array of energy exposure indicator pads direct-printed onto a surface of the component in a geometric pattern; wherein
  a plurality of energy exposure indicator pads in the geometric pattern include a mechanochromic material;
  a plurality of energy exposure indicator pads in the geometric pattern include a first thermochromic indicator responsive to temperatures within a first temperature range;
  a plurality of energy exposure indicator pads in the geometric pattern include a second thermochromic indicator responsive to temperatures within a second temperature range;
  a plurality of energy exposure indicator pads in the geometric pattern include a third thermochromic indicator responsive to temperatures within a third temperature range;
  provided that the first, second, and third temperature ranges are distinct from each other;
  an excitation source configured to illuminate the energy exposure indicator pads at a wavelength selected to elicit a detectable optical response from the energy exposure indicator pads;
  a detector configured to detect one or more optical responses from the energy exposure indicator pads including the mechanochromic material and first, second and third thermochromic indicators; and
  and a processor coupled to the detector configured to correlate the one or more detected optical responses with the environmental history of the component.

20. The system of claim 19, wherein correlating the one or more detected optical responses includes comparing the detected optical responses with one or more calibration curves that correlate the detected optical responses with the environmental history of the component.

* * * * *